US005782483A

United States Patent [19]

Rogers et al.

[11] Patent Number: 5,782,483

[45] Date of Patent: Jul. 21, 1998

[54] ADJUSTABLE WHEELBASE WHEELCHAIR

[75] Inventors: Richard H. Rogers, San Antonio, Tex.; Robert M. Huntress, San Diego, Calif.

[73] Assignee: Adorno/Rogers Technology, Inc., Austin, Tex.

[21] Appl. No.: 463,201

[22] Filed: Jun. 5, 1995

[51] Int. Cl.[6] .......... B62B 11/00

[52] U.S. Cl. .......... 280/642; 280/250.1; 280/42; 280/650

[58] Field of Search .......... 280/250.1, 282, 280/287, 638, 639, 642, 42, 647, 650, 657, 658; 297/DIG. 4

[56] References Cited

U.S. PATENT DOCUMENTS

| | | | |
|---|---|---|---|
| 4,007,947 | 2/1977 | Perego | 280/642 |
| 4,324,410 | 4/1982 | Perego | 280/650 X |
| 4,989,890 | 2/1991 | Lockard et al. | 280/250.1 X |
| 5,217,239 | 6/1993 | Koet | 280/647 X |
| 5,301,964 | 4/1994 | Papac | 280/250.1 |
| 5,301,970 | 4/1994 | Haskins | 280/250.1 |

*Primary Examiner*—Victor E. Johnson
*Attorney, Agent, or Firm*—David G. Henry

[57] ABSTRACT

An improved multi-wheeled vehicle having adjustable wheelbase dimensions. The preferred embodiment is a wheelchair which is adjustable as to length and width "on-the-fly." Contracting the two side frames effects a simultaneous retraction of the forward wheel struts. Thus, the length of the wheelchair is reduced at the same time the width is reduced, and vice versa. The linkage between the two side frames is preferably two cross members in an X configuration, one end of each cross member being pivotally affixed to one side frame on one side of the wheelchair, with the respective other end of each cross member being pivotally affixed to a wheel strut on the opposite side of the chair, the two wheel struts each being slidably attached to respective side frame.

9 Claims, 4 Drawing Sheets

ADJUSTABLE WHEELBASE WHEELCHAIR

BACKGROUND OF THE INVENTION

1. Field of The Invention

Applicant's invention relates to wheelchairs and other wheeled apparatuses having other than solely linear wheel arrays.

2. Background Information

Because wheelchairs must obviously have a high degree of stability for remaining upright when, for example, their users traverse sloped surfaces or effect rapid turns, traditional wheelchairs with fixed wheelbase dimensions are designed with suitably large wheelbase dimensions. A wheelchair with fixed wheelbase dimensions is an impediment to wheelchair users in many contexts. For example, maneuvering into small washrooms, around cramped office quarters, and through interior doors of most homes often makes access impossible. According to a survey by "Independent Living", it costs an average of $8000 to make an average home wheelchair accessible.

Another problem relating to excessive length and width of a standard wheelchair's wheelbase dimensions relates to air travel. Wheelchairs of standard dimension will not pass down an airliner aisle. This necessitates the transfer from one's regular wheelchair to one of the airline's uncomfortable and humiliating "people dollies."

These problems have been recognized, and attempts have been made to address the problem. There are, for example, wheelchairs the wheel base of which can be adjusted in width. However, all such chairs suffer from one or more shortcomings. In all cases, the seat (which is merely a sling type structure of reinforced vinyl or similar material) sags as the chair is contracted from its normal, most extended configuration to any narrower configuration. The only alternative being (such as if the chair is being narrowed for a long period of time as for a child's use until later growth) to replace the seat with a narrower sling. When a chair is momentarily contracted, and the seat sags, the user is uncomfortably compressed between the seat supports. In addition, to re-widen the chair, the user (or someone assisting the user) must act against the user's weight in expanding the seat supports and reversing the sagging of the seat.

Other chairs which are adjustable in length and/or width are designed for incremental and semi-permanent adjustments, not for ad hoc, easily reversible, on-the-fly adjustments as for temporarily dealing with obstacles which either can only be, or can more easily be traversed by a narrower and/or shorter wheelchair.

There exists a need among wheelchair users (of which Applicant is one) for a wheelchair (1) which adjusts in wheelbase dimensions; (2) the contour, size and height from the floor of the seat for which is not affected by an adjustment of wheelbase dimension; and (3) is adjustable on-the-fly, by the user alone to a width no greater than the seat. Despite the hundreds of wheelchair designs on the market, or depicted in wheelchair related patents, not one appears to address each of these objectives in combination.

It is important to note that the design for the base of Applicant's wheelchair has application beyond the field of wheelchairs. The novel expandable/retractable base design could be incorporated into any number of wheeled vehicles, carts, automobiles or other equipment for which it would be advantageous to provide an adjustable wheelbase, the operation of which need not affect the overlying remainder of the vehicles, etc. One example of an application of Applicant's design which is extremely far afield of the wheelchair art would be that of an industrial crane. An expansive wheelbase is desirable for most cranes. However, the wheelbase dimensions are quite limited for a vehicle-based crane which must travel by roadways. The traditional solution for providing a more stable base is to use outriggers. This, however, impedes ready movement of the crane about a work site once the outriggers are extended. Use of Applicant's base design would address this problem, as will be apparent following an exposition of Applicant's design and its operation.

SUMMARY OF THE INVENTION

It is an object of the present invention to provide a novel and unobvious vehicular chassis the wheelbase dimensions of which are adjustable with respect to both length and width.

It is another object of the present invention to provide a novel and unobvious wheelchair which provides for the adjustment of wheel base dimensions with respect to both length and width.

It is another object of the present invention to provide a novel and unobvious wheelchair, the adjustment of the wheelbase dimensions of which has no effect on the orientation, size or position of the attached seat.

It is another object of the present invention to provide a novel and unobvious wheelchair which permits on-the-fly adjustment of the length and width of the wheelbase.

It is another object of the present invention to provide a novel and unobvious wheelchair which permits on-the-fly adjustment of the length and width of the wheelbase, without affecting the size, orientation, or height position of the seat.

It is another object of the present invention to provide a novel and unobvious wheelchair which permits on-the-fly, simultaneous adjustment of the length and width of the wheelbase solely through application of compressive or expansive force to the wheels.

It is another object of the present invention to provide a novel and unobvious wheelchair the seat of which moves forward at half the rate of the simultaneously narrowing and shortening of the wheelbase to aid in maintaining the correct center of gravity.

In satisfaction of these and related objectives, Applicant's present invention provides a novel design for a vehicular chassis the wheelbase dimensions of which are simultaneously adjustable. The preferred embodiment of Applicant's invention is as part of a wheelchair which permits its user to contract the wheelbase or traversing narrow passageways or fitting into small spaces. The wheelchair which embodies Applicant's invention is constructed in a manner whereby adjusting the length and width of the wheelbase has no effect on the size, orientation or position of the seat relative to the base. This is a feature which, among others, dramatically distinguishes Applicant's design from those known in the prior art.

DETAILED DESCRIPTION OF THE PREFERRED EMBODIMENT

Figure 1:
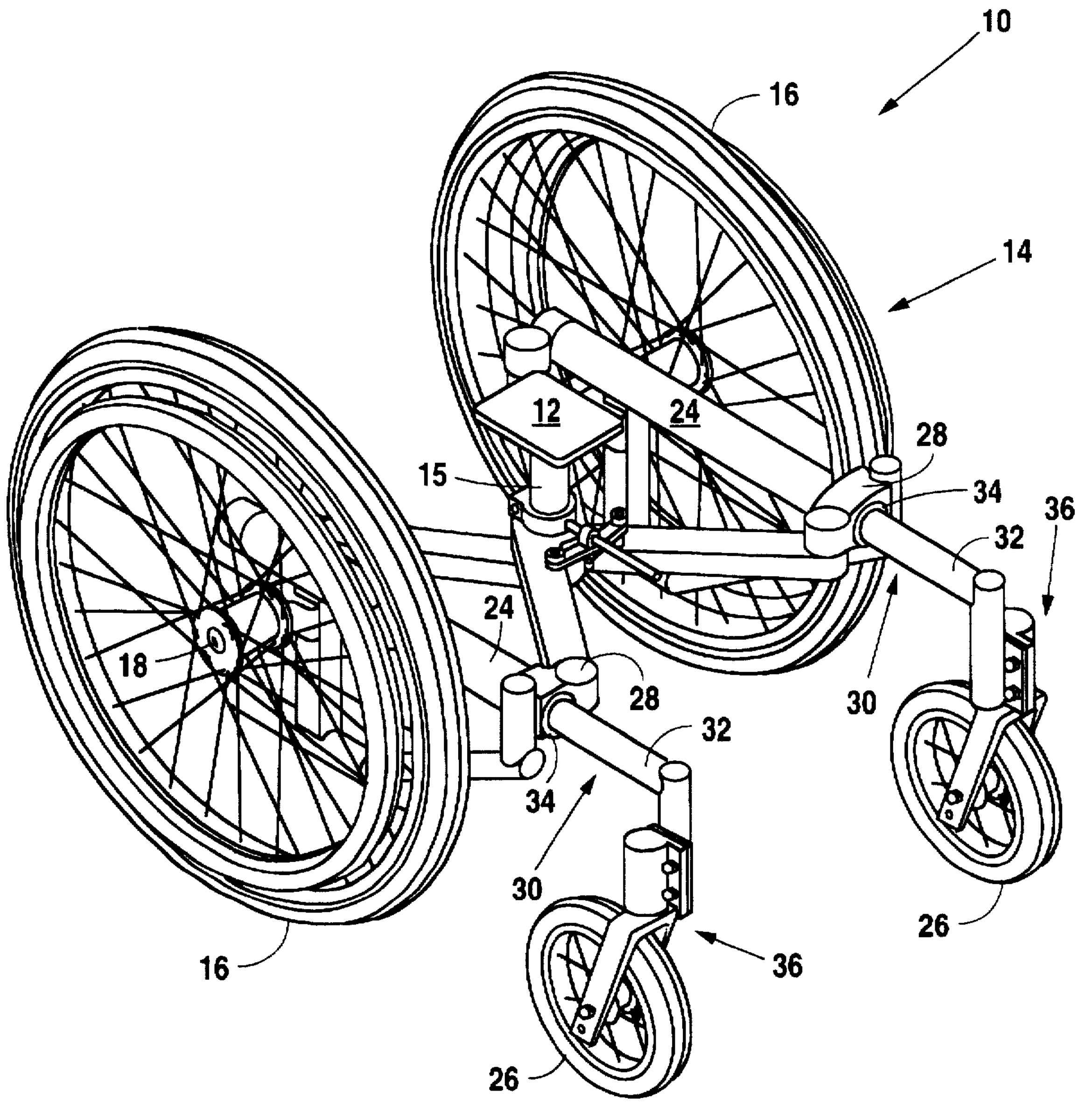
FIG. 1 is a perspective view of the preferred embodiment of Applicant's wheelchair (with the seat 12 being represented only by a base plate for improved visibility of components).
Figure 2:
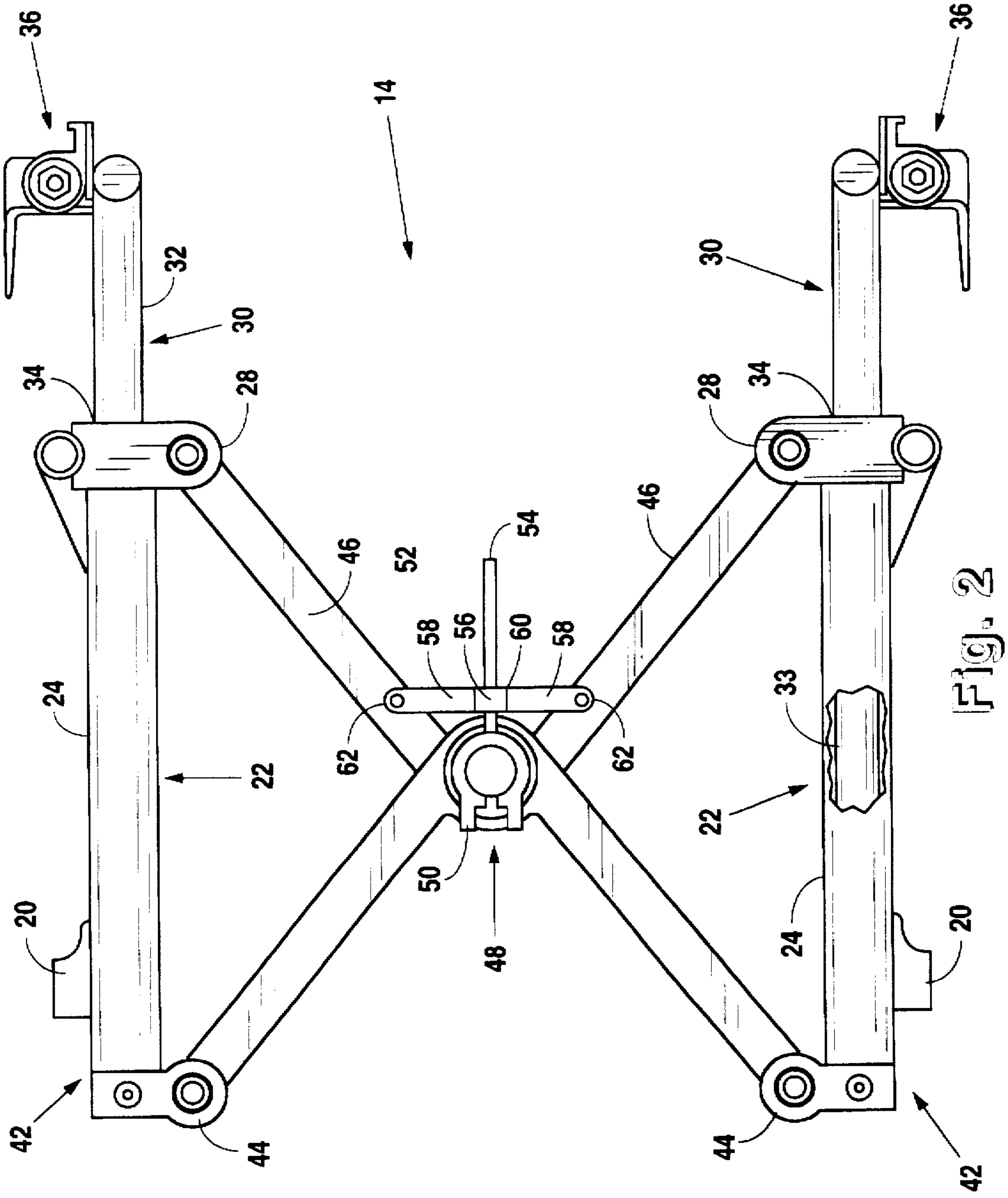
FIG. 2 is a top plan view of the base 14 preferred embodiment.
Figure 4B:
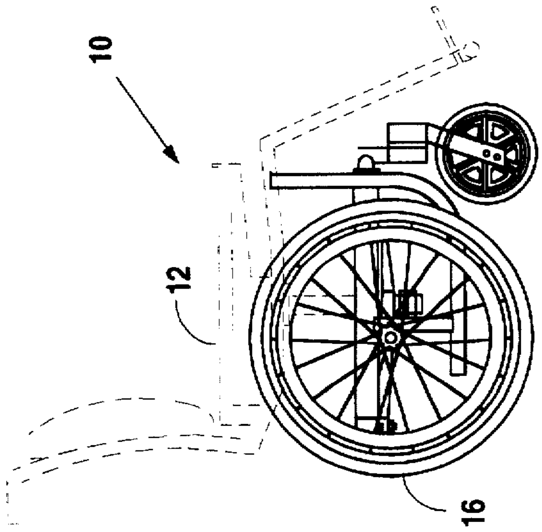
FIG. 4*b* is a side elevational view of Applicant's wheelchair in an intermediately expanded configuration.
Figure 4A:
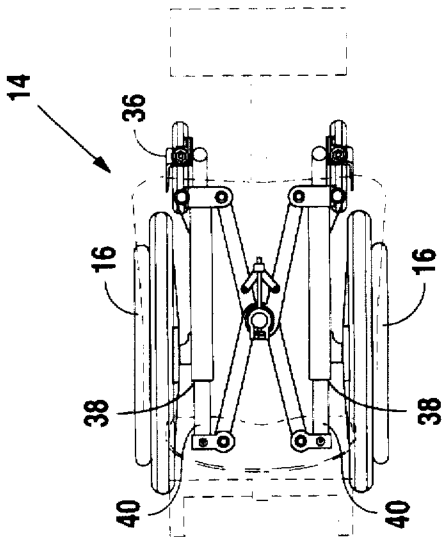
FIG. 4*a* is a top plan view of the base of Applicant's wheelchair in an intermediately expanded configuration.
Figure 3B:
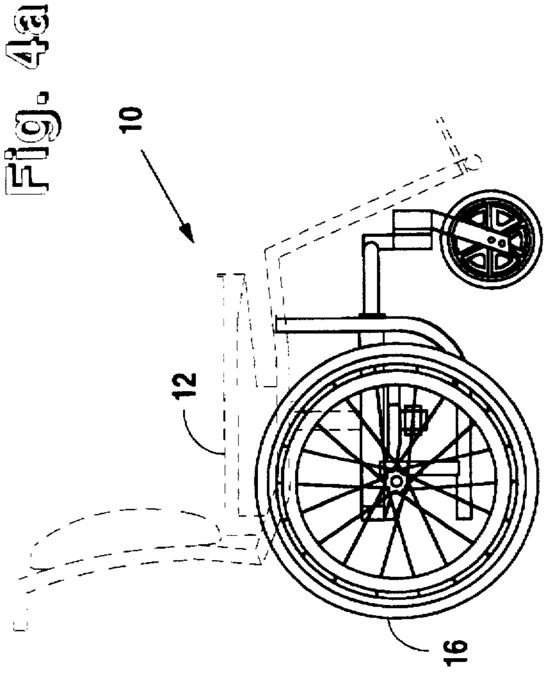
FIG. 3*b* is a side elevational view of Applicant's wheelchair in its most expanded configuration.
Figure 3A:
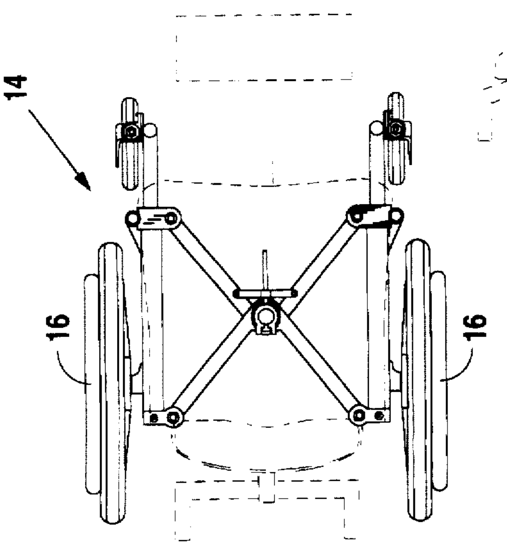
FIG. 3*a* is a top plan view of the base of Applicant's wheelchair in its most expanded configuration.
Figure 7:
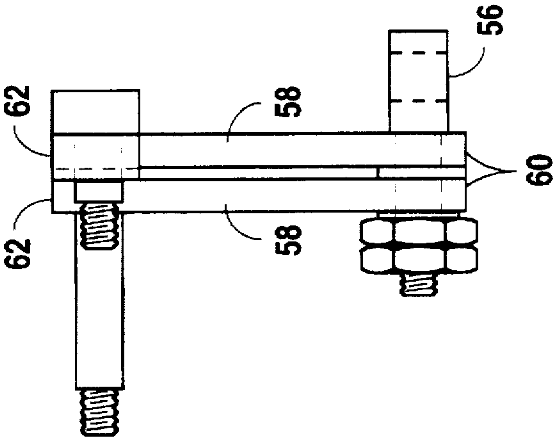
FIG. 7 is a side elevational view of the seat post guide assembly of FIG. 6.
Figure 8:
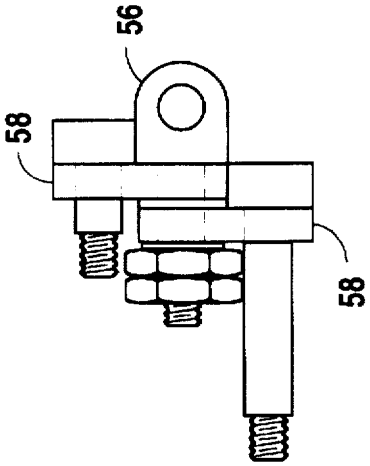
FIG. 8 is an end view of the seat post guide assembly of FIG. 6.
Figure 6:
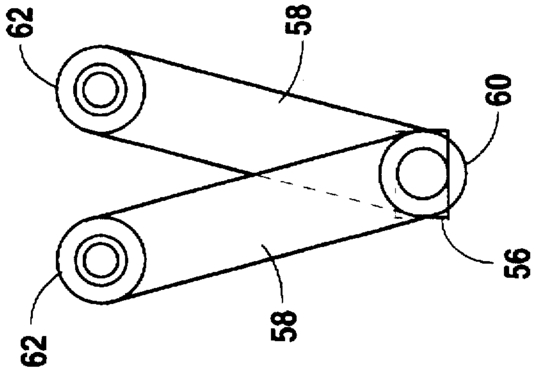
FIG. 6 is a top plan view of the seat post guide assembly of the preferred embodiment.
Figure 5A:
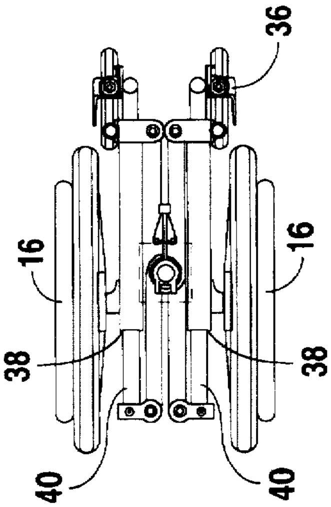
FIG. 5*a* is a top plan view of the base of Applicant's wheelchair in its most compact configuration.
Figure 5B:
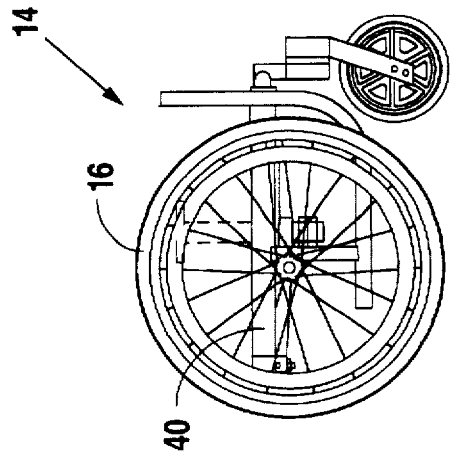
FIG. 5*b* is a side elevational view of Applicant's wheelchair in its most compact configuration.

Referring to FIGS. 1 and 2, the wheelchair of Applicant's invention is identified by the reference numeral 10. Wheelchair 10 will be used to demonstrate Applicant's design for a vehicle base, but it is to be understood that, as mentioned above, Applicant's invention has utility in fields quite unrelated to wheelchairs.

A revolutionary aspect of Applicant's approach to providing an expandable/retractable wheelchair is that of providing a base/seat interface which dissociates an associated seat's contour, dimensions, and above-ground height from the configuration of the base 14 with respect to wheelbase dimension. In most of the drawings, the seat 12 component of Applicant's chair 10 is represented by a base plate (as in FIG. 1) which would be part of any actual seat, but reference numeral 12 will also be used when an actual complete seat is shown. Seat 12 is of a fixed dimension, having a structure and supporting framework which is wholly independent of the base 14.

A conventional shaft locking mechanism (not shown in the drawings) is provided to also maintain, independent of changes to the wheelbase dimensions, a desired orientation of the seat 12. The interface between the seat 12 and the base 14 is merely a single post 15 with an appropriate latching mechanism. So long as it is adequately supported and maintained upright by the base 14, seat 12 is otherwise unaffected by any modifications or adjustments to the base 14 in ordinary use.

Referring to FIGS. 1, 2, 3*a*, 3*b*, 4*a*, 4*b*, 5*a*, and 5*b*, base 14 is designed whereby contraction of wheels 16 (thereby reducing the width of the wheelchair's footprint) simultaneously effects a contraction of the length of the chair 10's wheelbase. The converse is also true.

Wheels 16 are carried by axles 18 which, in turn, interface with axle blocks 20. Axle blocks 20 are integral components of side frames 22.

Each side frame 22 includes a wheel strut support carriage 24. Rigidly affixed to the support carriages 24, near the forward end 34 of support carriages 24 are forward cross member anchor blocks 28.

Extending through each wheel strut support carriage 24 is a wheel strut 30. Wheel struts 30 and support carriages 24 are configured whereby wheel struts 30 slide telescopically and bi-directionally through support carriages 24.

A forward terminal segment 32 of wheel strut 30 extends from the forward end 34 of support carriage 24 and is contoured to join a wheel assembly 36 (which carries forward wheels 26 at such an orientation as to support the base 14 in a desired attitude in view of the diameter and relative position of the wheels 16 in respect of side frames 22. Extending from the rearward end 38 of each support carriage 24 is a rearward terminal segment 40 of wheel strut 30. At the rearward terminus 42 of wheel strut 30 is affixed a rearward cross member anchor block 44.

It is to be understood that the absolute lengths of the segments of each wheel strut 30 which constitute forward terminal segment 32, intermediate segment 33 (that portion of wheel struts 30 which reside within support carriages 24), and rearward terminal segment 40 will, at any given time, vary depending on the extent to which the base 14 is configured near its most expansive wheelbase configuration, or vice versa. The basis for this variation will be clear from a review of the following portions of this specification.

Side frames 22, with their associated wheels 16, wheel struts 30, etc., are interconnected by way of a pair of scissor-action cross members 46. Cross members 46 pivot, and are secured in a scissor-like configuration about, a hub 48. A forward end of each cross member 46 is pivotally attached to the forward cross member anchor blocks 28 of one side of chair 10, while a rearward end of each cross member 46 is pivotally attached to rearward cross member anchor block 44 of the opposite side of the chair 10.

With reference to FIGS. 3*a*, 3*b*, 4*a*, 4*b*, 5*a*, and 5*b*, it can be appreciated how base 14 operates to simultaneously contract and expand the wheelbase dimensions with respect to both length and width. As side frames 22 are drawn closer together through application of a compressive force, the scissor action of cross members 46 exerts an expansive force to the rearward cross member anchor blocks 44 and the forward cross member anchor blocks 28 of each side of chair 10. Because the forward cross member anchor blocks 28 are rigidly affixed to support carriages 24, while the rearward cross member anchor blocks 44 are affixed to wheel struts 30, the only possible reaction to this expansive force is to effect a rearward movement of wheel struts 30 relative to support carriages 24 whereby a portion of the thus far intermediate segments 33 of each wheel strut 30 are drawn from the rearward end of support carriage 24 (thereby becoming a part of the rearward terminal segment 40), with a corresponding length of the thus far forward terminal segment 28 of each wheel strut 30 being drawn into support carriage 24. This has the effect of shortening the length of the chair's wheelbase, as the width thereof decreases. The effect of the reverse operation (applying an expansive force to the side frames 22 to widen the chair's wheelbase) obviously has the reverse effect on the length of the wheelbase.

For the eventuality that a user of chair 10 may lack the strength to effect an adequate expansive or compressive forces to expand or contract the wheelbase, a practitioner of Applicant's invention may provide spring-loaded caster pin locks (not shown in the drawings) which, through actuation of an appropriate control, effects a "toe-in" orientation of the forward wheels 17. When so actuated, forward motion of the chair 10 will necessarily effect a contraction of the wheelbase, and rearward motion will effect the converse.

Referring principally to FIG. 2, a seat post clamp 50 is affixed to the superior terminus of hub 48. To permit the compressive force of seat post clamp 50 to effect a secure interface between a seat post (not shown in this drawing) and the hub 48, the superior terminus of hub 48 is slotted longitudinally. This, in effect, creates a number of radially positioned "fingers" which grasp and secure a seat post under compressive force of the seat post clamp 50.

Referring in combination to FIGS. 2, and 6–8, during development of Applicant's preferred embodiment, it was discovered that a seat post 15 tended to rotate relative to the long axis of the base 14, particularly when the base 14 was expanded or contracted. This was an undesirable effect, as it is ordinarily desirable to maintain a parallel alignment between the long axis of the base 14 and the axis of lateral symmetry of the seat 12. To address this problem, a seat post guide assembly 52 was developed.

Seat post guide assembly 52 includes an alignment rod 54 which, in operation, extends from seat post clamp 50 parallel with the long axis of base 14. Alignment rod 54 telescopically extends through a guide collar 56 which is rotatably carried at, and extends through the apex ends 60 of two pivotally joined alignment bars 58. The respective base ends 62 of alignment bars 58 are pivotally affixed to the cross members 46 forward of hub 48. As the cross members 46 pivot about hub 48, alignment bars 58 move in such a manner that guide collar 56 slides along alignment rod 54, yet the orientation of alignment rod 54 (along with any seat attached thereto) remains constant in relation to the long axis of base 14.

Although the invention has been described with reference to specific embodiments, this description is not meant to be construed in a limited sense. In particular, it should be recognized that a three-wheeled vehicle could be designed through practice of Applicant's invention. One version of such a vehicle (not shown in the drawings) might exhibit forward terminal segments 32 of each of the wheel struts 30 which converge to join with a single forward wheel assembly 36. Provided a sufficient length of the forward terminal segments 32 remain straight before any convergence, to enable normal interaction with the strut support carriages 24, the same forward and rearward movement as is demonstrated for the two forward wheel assemblies 36 in the preferred embodiment will be seen with a single forward wheel assembly 36.

Various other modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A wheeled vehicle comprising:

a first frame member having a first frame member forward terminus and a first frame member rearward terminus;

a second frame member having a second frame member forward terminus and a second frame member rearward terminus;

first primary wheel means rotatably affixed to said first frame member;

second primary wheel means rotatably affixed to said second frame member;

a first wheel strut movably engaged with said first frame member and extending from said first frame member forward terminus, a first secondary wheel means being rotatably affixed to said first wheel strut, said first and said second primary wheel means and said first secondary wheel means being positioned relative to each other whereby they jointly define a single rolling plane on which said wheel means may roll;

a second wheel strut movably engaged with said second frame member and extending from said second frame member forward terminus;

adjustable frame connection means for expandably and contractibly connecting said first and second side frame members for enabling said first and second side frame members to reversibly move between a contracted side frame configuration wherein said first and second side frame members are juxtaposed and separated by a first distance and an expanded side frame configuration wherein said first and second side frame members are separated by a second distance, said second distance being greater than said first distance, said adjustable frame connection means having wheel strut extending and retracting means configured for extending said first and second wheel struts from said forward first and second side frame termini when said first and second side frame members are moved from said contracted side frame configuration toward said expanded side frame configuration and for retracting said first and second wheel struts toward said rearward first and second side frame termini when said first and second side frame members are moved from said expanded side frame configuration toward said contracted side frame configuration, said first and second primary wheel means and said first secondary wheel means remaining substantially positioned for simultaneous rolling on said rolling plane, with said wheeled vehicle remaining in a substantially constant vertical and horizontal orientation relative to said rolling plane, throughout said extending and retracting of said first and second wheel struts.

2. The invention of claim 1 wherein said adjustable frame connection means comprise:

a first cross member having a forward first cross member end and a rearward first cross member end, said rearward first cross member end being rotatably affixed to said first frame member and said forward first cross member end being rotatably affixed to said second wheel strut; and a second cross member having a forward second cross member end and a rearward second cross member end, said rearward second cross member end being rotatably affixed to said second frame member and said forward second cross member end being rotatably affixed to said first wheel strut.

3. The invention of claim 1 further comprising a second secondary wheel which is rotatably affixed to said second wheel strut.

4. The invention of claim 2 further comprising a second secondary wheel which is rotatably affixed to said second wheel strut.

5. The invention of claim 2 wherein:

said first cross member and said second cross member are affixed to said first and second side frame members and to said first and second wheel struts in an X configuration and said first and second cross members are pivotally joined to each other about a hub member.

6. The invention of claim 4 wherein:

said first cross member and said second cross member are affixed to said first and second side frame members and to said first and second wheel struts in an X configuration and said first and second cross members are pivotally joined to each other about a hub member.

7. A wheeled vehicle comprising:

a first frame member having a first frame member forward terminus and a first frame member rearward terminus;

a second frame member having a second frame member forward terminus and a second frame member rearward terminus;

first primary wheel means rotatably affixed to said first frame member;

second primary wheel means rotatably affixed to said second frame member;

a first wheel strut movably engaged with said first frame member and extending from said first frame member forward terminus, a first secondary wheel means being rotatably affixed to said first wheel strut;

a second wheel strut movably engaged with said second frame member and extending from said second frame member forward terminus;

adjustable frame connection means for expandably and contractibly connecting said first and second side frame members for enabling said first and second side frame members to reversibly move between a contracted side frame configuration wherein said first and second side frame members are juxtaposed and separated by a first distance and an expanded side frame configuration wherein said first and second side frame members are separated by a second distance, said second distance being greater than said first distance, said adjustable frame connection means having wheel strut extending and retracting means configured for extending said first and second wheel struts from said forward first and second side frame termini when said first and second side frame members are moved from said contracted side frame configuration toward said expanded side frame configuration and for retracting said first and second wheel struts toward said rearward first and second side frame termini when said first and second side frame members are moved from said expanded side frame configuration toward said contracted side frame configuration, said adjustable frame connection means comprising:

a first cross member having a forward first cross member end and a rearward first cross member end, said forward first cross member end being rotatably affixed to said first frame member and said rearward first cross member end being rotatably affixed to said second wheel strut; and a second cross member having a forward second cross member end and a rearward second cross member end, said forward second cross member end being rotatably affixed to said second frame member and said rearward second cross member end being rotatably affixed to said first wheel strut, said first cross member and said second cross member being affixed to said first and second side frame members and to said first and second wheel struts in an X configuration and said first and second cross members are pivotally joined to each other about a hub member; and a seat support member engaged with said hub member.

8. A wheeled vehicle comprising:

a first frame member having a first frame member forward terminus and a first frame member rearward terminus;

a second frame member having a second frame member forward terminus and a second frame member rearward terminus;

first primary wheel means rotatably affixed to said first frame member;

second primary wheel means rotatably affixed to said second frame member;

a first wheel strut movably engaged with said first frame member and extending from said first frame member forward terminus, a first secondary wheel means being rotatably affixed to said first wheel strut;

a second wheel strut movably engaged with said second frame member and extending from said second frame member forward terminus, a second secondary wheel means being rotatably affixed to said second wheel strut;

adjustable frame connection means for expandably and contractibly connecting said first and second side frame members for enabling said first and second side frame members to reversibly move between a contracted side frame configuration wherein said first and second side frame members are juxtaposed and separated by a first distance and an expanded side frame configuration wherein said first and second side frame members are separated by a second distance, said second distance being greater than said first distance, said adjustable frame connection means having wheel strut extending and retracting means configured for extending said first and second wheel struts from said forward first and second side frame termini when said first and second side frame members are moved from said contracted side frame configuration toward said expanded side frame configuration and for retracting said first and second wheel struts toward said rearward first and second side frame termini when said first and second side frame members are moved from said expanded side frame configuration toward said contracted side frame configuration, said adjustable frame connection means comprising:

a first cross member having a forward first cross member end and a rearward first cross member end, said forward first cross member end being rotatably affixed to said first frame member and said rearward first cross member end being rotatably affixed to said second wheel strut; and a second cross member having a forward second cross member end and a rearward second cross member end, said forward second cross member end being rotatably affixed to said second frame member and said rearward second cross member end being rotatably affixed to said first wheel strut, said first cross member and said second cross member being affixed to said first and second side frame members and to said first and second wheel struts in an X configuration and said first and second cross members are pivotally joined to each other about a hub member; and a seat support member engaged with said hub member.

9. A wheeled vehicle comprising:

a first side frame, a portion of which is configured as a first wheel strut carriage member, said first wheel strut carriage member defining an elongate first carriage channel oriented substantially in parallel with a first long axis of said first side frame, said first carriage channel having a first forward channel terminus and a first rearward channel terminus;

a first rearward wheel support assembly for rotatably carrying a first rearward wheel, said first rearward wheel support assembly being affixed to said first side frame in a substantially fixed spatial relationship relative to said first wheel strut carriage member;

an elongate first wheel strut telescopically engaged with said first wheel strut carriage member, an intermediate segment of said first wheel strut being slidably carried within bounds of said first carriage channel whereby said first wheel strut is moveable relative to said first wheel strut carriage member and in parallel with said first long axis with a first forward terminal segment of said first wheel strut extending from said first forward channel terminus of said first carriage channel, and a first rearward terminal segment of said first wheel strut extending from said first rearward channel terminus of said first carriage channel;

a first rearward cross member anchor block affixed to said first rearward terminal segment of said first wheel strut;

a first forward cross member anchor block affixed to said first wheel strut carriage member;

a first forward wheel support assembly for rotatably carrying a first forward wheel, said first forward wheel support assembly being affixed to said first forward terminal segment of said first wheel strut;

a second side frame, a portion of which is configured as a second wheel strut carriage member, said second wheel strut carriage member defining an elongate second carriage channel oriented substantially in parallel with a second long axis of said second side frame, said second carriage channel having a second forward channel terminus and a second rearward channel terminus;

a second rearward wheel support assembly for rotatably carrying a second rearward wheel, said second rearward wheel support assembly being affixed to said second side frame in a substantially fixed spatial relationship relative to said wheel strut carriage member;

an elongate second wheel strut telescopically engaged with said second wheel strut carriage member, an intermediate segment of said second wheel strut being slidably carried within bounds of said second carriage channel whereby said second wheel strut is moveable relative to said second wheel strut carriage member and in parallel with said second long axis with a second forward terminal segment of said second wheel strut extending from said second forward channel terminus of said second carriage channel, and a second rearward terminal segment of said second wheel strut extending from said second rearward channel terminus of said second carriage channel; a second rearward cross member anchor block affixed to said second rearward terminal segment of said second wheel strut;

a second forward cross member anchor block affixed to said second wheel strut carriage member;

a first cross member having a first forward cross member terminus and a first rearward cross member terminus, said first forward cross member terminus being pivotally attached to said first forward cross member anchor block and said first rearward cross member terminus being pivotally attached to said second rearward cross member anchor block; and a second cross member having a second forward cross member terminus and a second rearward cross member terminus, said second forward cross member terminus being pivotally attached to said second forward cross member anchor block and said second rearward cross member terminus being pivotally attached to said first rearward cross member anchor block.

* * * * *